US008229832B2

(12) United States Patent
Lutnick et al.

(10) Patent No.: US 8,229,832 B2
(45) Date of Patent: Jul. 24, 2012

(54) SYSTEMS AND METHODS FOR ESTABLISHING FIRST ON THE FOLLOW TRADING PRIORITY IN ELECTRONIC TRADING SYSTEMS (75) Inventors: Howard W. Lutnick, New York, NY (US); Joseph Noviello, Summit, NJ (US); Michael Sweeting, Aldershot (GB)

(73) Assignee: BGC Partners, Inc., New York, NY (US)

( * ) Notice: Subject to any disclaimer, the term of this patent is extended or adjusted under 35 U.S.C. 154(b) by 738 days.

(21) Appl. No.: 11/328,814

(22) Filed: Jan. 9, 2006

(65) Prior Publication Data
US 2007/0174162 A1    Jul. 26, 2007

(51) Int. Cl.
*G06Q 40/00* (2012.01)
(52) U.S. Cl. ........................................................ 705/37
(58) Field of Classification Search ....................... 705/37
See application file for complete search history.

(56) References Cited

U.S. PATENT DOCUMENTS

| 2,134,118 | A | 10/1938 | Foss |
| 3,541,526 | A | 11/1970 | Levy, et al. |
| 3,573,747 | A | 4/1971 | Adams et al. |
| 3,581,072 | A | 5/1971 | Nymeyer |
| 3,656,148 | A | 4/1972 | Belcher et al. |
| D225,858 | S | 1/1973 | Kline |
| 3,976,840 | A | 8/1976 | Cleveland et al. |
| 4,141,001 | A | 2/1979 | Suzuki et al. |
| 4,412,287 | A | 10/1983 | Braddock, III |
| 4,551,717 | A | 11/1985 | Dreher |
| 4,674,044 | A | 6/1987 | Kalmus et al. |
| 4,677,552 | A | 6/1987 | Sibley, Jr. |
| 4,789,928 | A | 12/1988 | Fujisaki |
| 4,799,156 | A | 1/1989 | Shavit et al. |
| 4,823,265 | A | 4/1989 | Nelson |
| 4,903,201 | A | 2/1990 | Wagner |
| 4,906,117 | A | 3/1990 | Birdwell |
| D308,693 | S | 6/1990 | Sakaguchi et al. |
| 4,951,196 | A | 8/1990 | Jackson |
| 4,980,826 | A | 12/1990 | Wagner |
| 5,038,284 | A | 8/1991 | Kramer |

(Continued)

FOREIGN PATENT DOCUMENTS

DE        19606467        8/1997

(Continued)

OTHER PUBLICATIONS

U.S. Appl. No. 11/621,546, filed Jan. 9, 2007, Lutnick, et al.

(Continued)

*Primary Examiner* — Thomas M Hammond, III
*Assistant Examiner* — Seth Weis (57) ABSTRACT

Systems and methods for trading an item in an electronic trading system are provided. The method preferably includes transitioning the trading system from a first trading state to a second trading state. Once the trading system has transitioned to the second state, the method includes determining whether an existing order qualifies for trading priority and/or exclusivity in the second trading state with respect to an incoming contra order. This determining of trading rights in the second trading state is preferably based on the status of trading priority in the first trading state and also a set of predetermined criteria with respect to an incoming contra order in the second trading state. If the existing order qualifies for trading priority, then the system preferably presents the incoming contra order for trading exclusively or semi-exclusively to the participant associated with the existing order.

36 Claims, 11 Drawing Sheets

U.S. PATENT DOCUMENTS

| | | |
|---|---|---|
| 5,077,665 A | 12/1991 | Silverman et al. |
| 5,101,353 A | 3/1992 | Lupien et al. |
| D327,057 S | 6/1992 | Gosch |
| 5,136,501 A | 8/1992 | Silverman et al. |
| 5,150,118 A | 9/1992 | Finkle et al. |
| 5,168,446 A | 12/1992 | Wiseman |
| 5,181,809 A | 1/1993 | Martin |
| 5,193,924 A | 3/1993 | Larson |
| D335,660 S | 5/1993 | Busch |
| 5,243,331 A | 9/1993 | McCausland et al. |
| 5,253,940 A | 10/1993 | Abecassis |
| 5,258,908 A | 11/1993 | Hartheimer et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,339,392 A | 8/1994 | Risberg et al. |
| 5,347,452 A | 9/1994 | Bay, Jr. |
| 5,361,199 A | 11/1994 | Shoquist et al. |
| 5,367,298 A | 11/1994 | Axthelm |
| 5,373,055 A | 12/1994 | Ohmae et al. |
| 5,375,055 A | 12/1994 | Togher et al. |
| 5,463,547 A | 10/1995 | Markowitz et al. |
| 5,579,002 A | 11/1996 | Iggulden et al. |
| 5,640,569 A | 6/1997 | Miller et al. |
| 5,667,319 A | 9/1997 | Satloff |
| 5,668,358 A | 9/1997 | Wolf et al. |
| 5,689,652 A | 11/1997 | Lupien et al. |
| 5,710,889 A | 1/1998 | Clark et al. |
| 5,715,402 A | 2/1998 | Popolo |
| 5,717,989 A | 2/1998 | Tozzoli et al. |
| 5,727,165 A | 3/1998 | Ordish et al. |
| 5,757,292 A | 5/1998 | Amro et al. |
| 5,774,880 A | 6/1998 | Ginsberg |
| 5,787,402 A | 7/1998 | Potter et al. |
| 5,794,219 A | 8/1998 | Brown |
| 5,802,497 A | 9/1998 | Manasse |
| 5,826,244 A | 10/1998 | Huberman |
| 5,832,462 A | 11/1998 | Midorikawa et al. |
| 5,835,896 A | 11/1998 | Fisher et al. |
| 5,842,178 A | 11/1998 | Giovannoli |
| 5,845,261 A | 12/1998 | McAbian |
| 5,845,266 A | 12/1998 | Lupien |
| 5,873,071 A | 2/1999 | Ferstenberg et al. |
| 5,878,139 A | 3/1999 | Rosen |
| 5,890,138 A | 3/1999 | Godin |
| 5,905,974 A | 5/1999 | Fraser et al. |
| 5,905,975 A | 5/1999 | Ausubel |
| 5,914,715 A | 6/1999 | Sasaki |
| 5,915,209 A | 6/1999 | Lawrence |
| 5,924,082 A | 7/1999 | Silverman et al. |
| 5,926,801 A | 7/1999 | Matsubara et al. |
| 5,950,176 A | 9/1999 | Keiser et al. |
| 5,963,923 A | 10/1999 | Garber |
| 5,987,419 A | 11/1999 | Hachino et al. |
| 6,014,627 A | 1/2000 | Togher et al. |
| 6,016,483 A | 1/2000 | Rickard et al. |
| 6,029,146 A | 2/2000 | Hawkins et al. |
| 6,098,051 A | 8/2000 | Lupien et al. |
| 6,134,535 A | 10/2000 | Belzberg |
| 6,141,653 A | 10/2000 | Conklin et al. |
| 6,151,588 A | 11/2000 | Tozzoli et al. |
| 6,195,647 B1 | 2/2001 | Martyn et al. |
| 6,199,050 B1 | 3/2001 | Alaia et al. |
| 6,211,880 B1 | 4/2001 | Impink, Jr. |
| 6,230,146 B1 | 5/2001 | Alaia et al. |
| 6,230,147 B1 | 5/2001 | Alaia et al. |
| 6,247,000 B1 | 6/2001 | Hawkins et al. |
| 6,259,044 B1 | 7/2001 | Paratore et al. |
| 6,263,321 B1 | 7/2001 | Daughtery, III |
| 6,272,474 B1 | 8/2001 | Garcia |
| 6,278,982 B1 | 8/2001 | Korhammer et al. |
| 6,282,521 B1 | 8/2001 | Howorka |
| 6,311,178 B1 | 10/2001 | Bi et al. |
| 6,317,727 B1 | 11/2001 | May |
| 6,317,728 B1 | 11/2001 | Kane |
| 6,343,278 B1 | 1/2002 | Jain et al. |
| 6,363,365 B1 | 3/2002 | Kou |
| 6,405,180 B2 | 6/2002 | Tilfors et al. |
| 6,421,653 B1 | 7/2002 | May |
| 6,434,536 B1 | 8/2002 | Geiger |
| 6,438,575 B1 | 8/2002 | Khan et al. |
| 6,477,513 B1 | 11/2002 | Walker et al. |
| 6,505,174 B1 | 1/2003 | Keiser et al. |
| 6,519,574 B1 | 2/2003 | Wilton et al. |
| 6,560,580 B1 | 5/2003 | Fraser et al. |
| 6,625,583 B1 | 9/2003 | Silverman et al. |
| 6,629,082 B1 | 9/2003 | Hambrecht |
| D491,944 S | 6/2004 | Lutnick et al. |
| 6,772,132 B1 | 8/2004 | Kemp, II et al. |
| D496,663 S | 9/2004 | Lutnick et al. |
| D497,912 S | 11/2004 | Lutnick et al. |
| D498,476 S | 11/2004 | Lutnick et al. |
| 6,850,907 B2 | 2/2005 | Lutnick et al. |
| D502,467 S | 3/2005 | Lutnick et al. |
| D503,712 S | 4/2005 | Lutnick et al. |
| D503,713 S | 4/2005 | Lutnick et al. |
| D503,935 S | 4/2005 | Lutnick et al. |
| D504,131 S | 4/2005 | Lutnick et al. |
| 6,903,662 B2 | 6/2005 | Rix et al. |
| 6,912,126 B2 | 6/2005 | Rudd et al. |
| 6,963,856 B2 | 11/2005 | Lutnick et al. |
| 6,965,511 B2 | 11/2005 | Rudd et al. |
| D516,072 S | 2/2006 | Lutnick et al. |
| 7,000,181 B2 | 2/2006 | Press |
| 7,003,488 B2 | 2/2006 | Dunne et al. |
| 3,249,919 A1 | 5/2006 | Scantlin |
| 7,076,461 B2 | 7/2006 | Balabon |
| 7,080,033 B2 | 7/2006 | Wilton et al. |
| 7,157,651 B2 | 1/2007 | Rix et al. |
| 7,243,083 B2 | 7/2007 | Burns et al. |
| 7,283,067 B2 | 10/2007 | Lutnick et al. |
| 7,392,212 B2 | 6/2008 | Hancock et al. |
| 7,392,214 B1 | 6/2008 | Fraser et al. |
| 7,392,217 B2 | 6/2008 | Gilbert et al. |
| 7,400,270 B2 | 7/2008 | Lutnick et al. |
| 7,496,533 B1 | 2/2009 | Keith |
| 7,523,064 B2 | 4/2009 | Burns et al. |
| 7,552,084 B2 | 6/2009 | Fraser et al. |
| 2001/0003179 A1 | 6/2001 | Martyn et al. |
| 2001/0032175 A1 | 10/2001 | Holden et al. |
| 2001/0037279 A1 | 11/2001 | Yeo |
| 2002/0023037 A1 | 2/2002 | White |
| 2002/0023042 A1 | 2/2002 | Solomon |
| 2002/0026321 A1 | 2/2002 | Faris et al. |
| 2002/0029180 A1 | 3/2002 | Kirwin et al. |
| 2002/0070915 A1 | 6/2002 | Mazza et al. |
| 2002/0073014 A1 | 6/2002 | Gilbert |
| 2002/0082976 A1 | 6/2002 | Howorka |
| 2002/0091626 A1 | 7/2002 | Johnson et al. |
| 2002/0107784 A1 | 8/2002 | Hancock et al. |
| 2002/0128945 A1 | 9/2002 | Moss et al. |
| 2002/0143690 A1 | 10/2002 | Mahajan et al. |
| 2002/0154038 A1 | 10/2002 | Houston |
| 2002/0156716 A1 | 10/2002 | Adatia |
| 2002/0161690 A1 | 10/2002 | McCarthy et al. |
| 2002/0169703 A1 | 11/2002 | Lutnick et al. |
| 2002/0178104 A1 | 11/2002 | Hausman |
| 2002/0198815 A1 | 12/2002 | Greifeld et al. |
| 2003/0004862 A1 | 1/2003 | Lutnick et al. |
| 2003/0009411 A1 | 1/2003 | Ram et al. |
| 2003/0033239 A1 | 2/2003 | Gilbert |
| 2003/0050888 A1 | 3/2003 | Satow et al. |
| 2003/0065613 A1 | 4/2003 | Smith |
| 2003/0083976 A1 | 5/2003 | McLister |
| 2003/0097323 A1 | 5/2003 | Khalfan et al. |
| 2003/0149636 A1 | 8/2003 | Lutnick et al. |
| 2003/0229571 A1 | 12/2003 | May |
| 2003/0229900 A1 | 12/2003 | Reisman |
| 2003/0236737 A1 | 12/2003 | Kemp et al. |
| 2004/0030634 A1 | 2/2004 | Satow |
| 2004/0034591 A1 | 2/2004 | Waelbroeck et al. |
| 2004/0044610 A1 | 3/2004 | Fraser et al. |
| 2004/0059666 A1 | 3/2004 | Waelbroeck et al. |
| 2004/0117292 A1 | 6/2004 | Brumfield et al. |
| 2004/0117331 A1 | 6/2004 | Lutnick et al. |
| 2004/0140998 A1 | 7/2004 | Gravina et al. |
| 2004/0158519 A1 | 8/2004 | Lutnick et al. |

| | | | | | |
|---|---|---|---|---|---|
| 2004/0193519 A1 | 9/2004 | Sweeting et al. | JP | 11-282600 | 3/1998 |
| 2004/0210504 A1 | 10/2004 | Rutman | JP | 2002-032565 | 7/2000 |
| 2004/0210511 A1* | 10/2004 | Waelbroeck et al. ............ 705/37 | JP | 2001-501333 | 1/2001 |
| 2004/0210512 A1* | 10/2004 | Fraser et al. ..................... 705/37 | KR | 1992-700435 | 2/1992 |
| 2004/0218963 A1 | 11/2004 | Van Diepen et al. | WO | 85/04271 | 9/1985 |
| 2005/0004852 A1 | 1/2005 | Whitney | WO | 87/03115 | 5/1987 |
| 2005/0038731 A1 | 2/2005 | Sweeting et al. | WO | WO 93/15467 | 8/1993 |
| 2005/0038732 A1 | 2/2005 | Sweeting et al. | WO | WO 95/26005 | 9/1995 |
| 2005/0055304 A1* | 3/2005 | Lutnick et al. .................. 705/37 | WO | WO 96/05563 A1 | 2/1996 |
| 2005/0075966 A1 | 4/2005 | Duka | WO | WO 96/34356 | 10/1996 |
| 2005/0108079 A1 | 5/2005 | Langridge | WO | WO 97/37315 | 10/1997 |
| 2005/0108653 A1 | 5/2005 | Langridge | WO | WO 98/26363 | 6/1998 |
| 2005/0119966 A1 | 6/2005 | Sandholm et al. | WO | WO 98/34187 | 8/1998 |
| 2005/0160032 A1 | 7/2005 | Lutnick et al. | WO | WO 98/49639 | 11/1998 |
| 2005/0171895 A1 | 8/2005 | Howorka et al. | WO | WO 98/52133 | 11/1998 |
| 2005/0216393 A1 | 9/2005 | Lutnick et al. | WO | WO 99/19821 | 4/1999 |
| 2005/0222941 A1 | 10/2005 | Tull, Jr. | WO | WO 00/11588 | 3/2000 |
| 2006/0007160 A1 | 1/2006 | Lutnick et al. | WO | WO 00/26745 | 5/2000 |
| 2006/0059079 A1 | 3/2006 | Howorka | WO | WO 01/50317 | 12/2000 |
| 2006/0069635 A1 | 3/2006 | Ram et al. | WO | WO 01/69366 | 9/2001 |
| 2006/0080214 A1 | 4/2006 | Hausman et al. | WO | WO 03/026135 | 3/2003 |
| 2006/0086726 A1 | 4/2006 | Yamamoto et al. | WO | WO2006108158 | 4/2006 |
| 2006/0229967 A1 | 10/2006 | Sweeting | | | |
| 2006/0265304 A1 | 11/2006 | Brumfield et al. | | | |
| 2006/0265305 A1 | 11/2006 | Schluetter et al. | | | |
| 2006/0271475 A1 | 11/2006 | Brumfield et al. | | | |
| 2006/0277136 A1 | 12/2006 | O'Connor et al. | | | |
| 2007/0100735 A1 | 5/2007 | Kemp et al. | | | |
| 2007/0150708 A1 | 6/2007 | Billeci | | | |
| 2007/0174162 A1 | 7/2007 | Lutnick et al. | | | |
| 2007/0226120 A1 | 9/2007 | Nanjundamoorthy | | | |
| 2007/0244795 A1 | 10/2007 | Lutnick et al. | | | |
| 2007/0244796 A1 | 10/2007 | Lutnick et al. | | | |
| 2007/0250438 A1 | 10/2007 | Fraser et al. | | | |
| 2007/0255642 A1 | 11/2007 | Keith | | | |
| 2008/0001786 A1 | 1/2008 | Lutnick et al. | | | |
| 2008/0071670 A1 | 3/2008 | Fraser et al. | | | |
| 2008/0071671 A1 | 3/2008 | Fraser et al. | | | |
| 2008/0077523 A1 | 3/2008 | Fraser et al. | | | |
| 2008/0140558 A1 | 6/2008 | Reuter et al. | | | |
| 2009/0073004 A1 | 3/2009 | Lutnick et al. | | | |

FOREIGN PATENT DOCUMENTS

| | | |
|---|---|---|
| EP | 0412308 | 2/1991 |
| EP | 0416482 | 3/1991 |
| EP | 0512702 | 11/1992 |
| EP | 0733963 B1 | 9/1996 |
| EP | 0828223 A2 | 3/1998 |
| EP | 0993995 B1 | 4/2000 |
| EP | 1006472 | 6/2000 |
| GB | 2256954 A | 12/1992 |
| GB | 2258061 | 1/1993 |
| GB | 2313276 | 11/1997 |
| JP | 358161068 | 9/1983 |
| JP | 59184929 | 10/1984 |
| JP | 62-256164 | 11/1987 |

OTHER PUBLICATIONS

U.S. Appl. No. 11/621,547, filed Jan. 9, 2007, Lutnick, et al.
USPTO Office Action for U.S. Appl. No. 11/621,546, filed Jul. 7, 2008.
U.S. Appl. No. 11/328,814, filed Jan. 9, 2006, Lutnick, et al.
USPTO Office Action for U.S. Appl. No. 10/699,858, May 6, 2009; 8 pages.
USPTO Office Action for U.S. Appl. No. 11/621,546, May 5, 2009; 17 pages.
USPTO Office Action for U.S. Appl. No. 11/080,322, Apr. 16, 2009; 10 pages.
USPTO Office Action for U.S. Appl. No. 10/382,527, May 12, 2009; 8 pages.
MAOI Technologies Announces IIVEeXCHANGE 2.1, PR Newswire, New York, Sep. 14, 1998, p. 1. Retrieved from ProQuest.
AU Examiner Report for AU Application No. 2007204680; 4 pages; Aug. 11, 2010.
EP Office Action for Application No. 07710023.8; 3 pages; Sep. 6, 2010.
U.S. PTO Office Action for U.S. Appl. No. 11/760,508; 16 pages; Apr. 13, 2010.
U.S. PTO Office Action for U.S. Appl. No. 11/947,231; 7 pages; Apr. 15, 2010.
U.S. Appl. No. 12/051,708, filed Mar. 19, 2008; 16 pages.
U.S. Appl. No. 11/947,347, filed Apr. 28, 2010; 10 pages.
U.S. PTO Office Action for U.S. Appl. No. 12/051,708 dated Apr. 30, 2010; 6 pages.

* cited by examiner

| ITEM | MARKET | | | | | LAST PRICE |
|---|---|---|---|---|---|---|
| BOND A (302) | *100.21 − 100.22 (304) | 127 x 60 (306) ← 301 | | | | 100.20 (308) |
| | 100.20 − 100.23<br>100.19 − 100.24 (310) | 30 x 30<br>100 x 30 | | *3<br>1<br>100 (312) | 2<br>22<br>30 (314) | |

SYSTEMS AND METHODS FOR ESTABLISHING FIRST ON THE FOLLOW TRADING PRIORITY IN ELECTRONIC TRADING SYSTEMS

INTRODUCTION

The present invention relates to electronic systems and methods for obtaining trading exclusivity and/or trading priority in electronic trading systems.

BACKGROUND OF THE INVENTION

In electronic trading systems that include bids and offers for items, a bid or offer that is entered by a participant may typically be entered as available (referred to alternatively hereinafter as "clear") to trade to other participants. Nevertheless, certain known trading systems may restrict the availability to certain participant(s) under certain conditions. For example, a Bid/Offer may be available only to the current market participants, i.e., those with current commitments (bids/offers). Accordingly, preferably only those customers with current participation can hit or lift these incoming entries. Such bids/offers may be considered unclear—i.e., not available to all trading participants.

In one type of trading system, the uncleared bids become available to participants other than the current participants only after a preset or predetermined time interval has expired (tracked by a internal system clock or other suitable device).

One criteria that may affect order priority—e.g., the exclusive right of certain participants to trade on incoming orders—is the respective priority of participants following the transition from a first trading state to a second trading state. For the purposes of this application, a trading state is defined as a set of rules or conditions that govern the interaction between trading participants.

It would be desirable to provide systems and methods that further define the rules or conditions that govern the interaction between trading participants when the system transitions from one trading state to a second trading state.

SUMMARY OF THE INVENTION

It would be desirable to provide systems and methods that further define the rules or conditions that govern the interaction between trading participants when the system transitions from one trading state to a second trading state.

Systems and methods for trading an item in an electronic trading system are provided. A method according to the invention preferably includes transitioning the trading system from a first trading state to a second trading state. Once the trading system has transitioned to the second state, the method includes determining whether an existing order qualifies for trading rights—i.e., trading priority and/or exclusivity—in the second trading state. This determining of trading rights in the second trading state is preferably based on the status of trading rights in the first trading state and also a set of predetermined criteria with respect to an incoming contra order—i.e., an order on the other side of a trade or active market (e.g., a bid is contra to an offer or other instruction to sell, an offer is contra to a bid or instruction to buy)—in the second trading state. If the existing order qualifies for trading rights, then the system preferably presents the incoming contra order for trading exclusively or semi-exclusively to the participant associated with the existing order.

BRIEF DESCRIPTION OF THE DRAWINGS

Further features of the invention, its nature and various advantages will be apparent from the following detailed description of the preferred embodiments, taken in conjunction with the accompanying drawings, in which like reference characters refer to like parts throughout, and in which.

DETAILED DESCRIPTION OF THE INVENTION

In one aspect of the invention, trading rules according to the invention disclosed herein relate to being "first-on-the-follow". These first-on-the-follow rules relate to the respective priority of participants following the transition from a first trading state to a second trading state (for the purposes of this application, a trading state is defined as a set of rules or conditions that govern the interaction between trading participants—transition from one trading state to a second trading state signifies transitioning from one set of rules or conditions to a second set of rules or conditions). First-on-the-follow rules relate in large part to identifying the participant that will have the right to trade exclusively (semi-exclusively)—i.e., the exclusive bidder on incoming offers and the exclusive offeror on incoming bids—at the commencement of the new state. It should be noted that in some embodiment of the invention, the first on the follow participant may be granted exclusive or semi-exclusive rights, depending on the rules of the trading system. Any references herein, or in the figures, to exclusive rights should be understood to refer to either an exclusive or semi-exclusive set of rights.

Typically, first-on-the-follow priority rights are obtained by the participants identified as the best bidder and the best offeror (the term best being defined as highest bidder/buyer with respect to price/time priority and lowest offeror/seller with respect to price/time priority) at the conclusion of the first trade state. In first-on-the-follow rules according to the invention, participants that were previously identified as the best bidder and best offeror at the conclusion of the first trade state may only obtain the first-on-the-follow rights in the second trade state if the best bidder and the best offeror satisfy either a certain minimum order size requirement, are within a certain predetermined delta (as described in more detail below) of the best bidder and the best offeror, respectively, or satisfy a combination of the minimum order size requirement and the predetermined delta restriction.

Alternatively, an additional restriction with respect to obtaining first-on-the-follow rights may relate to the amount purchased or sold during the first trade state by the prospective first-on-the-follow participant. It should be noted that first-on-the-follow rights may obtain a particular advantage for the participant at least because these rights, in some embodiments of the invention, may entitle the participants to priority with respect to any incoming orders at the commencement of the second trading state.

With respect to hidden size, as described below, a participant's hidden size may be considered in satisfying the participant's minimum size requirement for obtaining first-on-the-follow rights.

In yet another rule according to the invention, if a participant satisfies first-on-the-follow requirements, then the participant may have a preset instruction to the system to either reduce his bid by a predetermined increment or increase his offer by an increment in the second trading state. Preferably, the respective increase or decrease reduces his exposure to an incoming order while maintaining his first-on-the-follow position, and the trading privileges, such as, for example, the exclusive right to trade against incoming orders, associated therewith. Alternatively, exposure may be reduced by reducing the size of the first on the follow order.

In an alternative embodiment, the order that is first on the follow should preferably be within a predetermined delta of the best contra order, or the incoming order should preferably satisfy some combination of the threshold size and the predetermined delta in order to only be shown to or, alternatively, to only be available to be traded by, select participants that are first on the follow.

With respect to yet another embodiment of the invention, hidden size—i.e., a portion of the order that is not shown to the rest of the participants, but, if acted upon, is tradable—may also count toward satisfying the minimum size requirement of the order either as the first on the follow order or the current order in the system.

Yet another aspect of the invention provides rules associated with a method that restricts all incoming orders to a select number of traders. For example, the exclusive bidder or offeror preferably has an option to exclusively trade on an incoming order, although another participant is behind the exclusive bidder or offeror and has the ability to indicate a willingness to hit the incoming bid or lift the incoming offer if the exclusive bidder or offeror refuses to act on the incoming order. In one rule according to the invention, the exclusive bidder or offeror may preferably set, or have set, his respective default position to trade on an incoming bid or offer when there is another participant who has indicated a willingness to hit the incoming bid or lift the incoming offer. Thus, the default position becomes a "take when (another party has indicated that he is willing . . . ) take" or "hit when (another party has indicated that he is willing . . . ) hit."

This rule may preferably be implemented in at least a state where bids and offers are posted—i.e., a bid/offer state—as well as a state wherein trades actually occur and bids and offers are matched.

It should be noted that the default position described herein for the take-when-take or hit-when-hit order may preferably be further restricted to only act when the incoming order is a predetermined delta, as described in more detail above, from the headline price (see element 304 in FIG. 3) in bid/offer state, or the trading price in the state in which matches occur.

Figure 1:
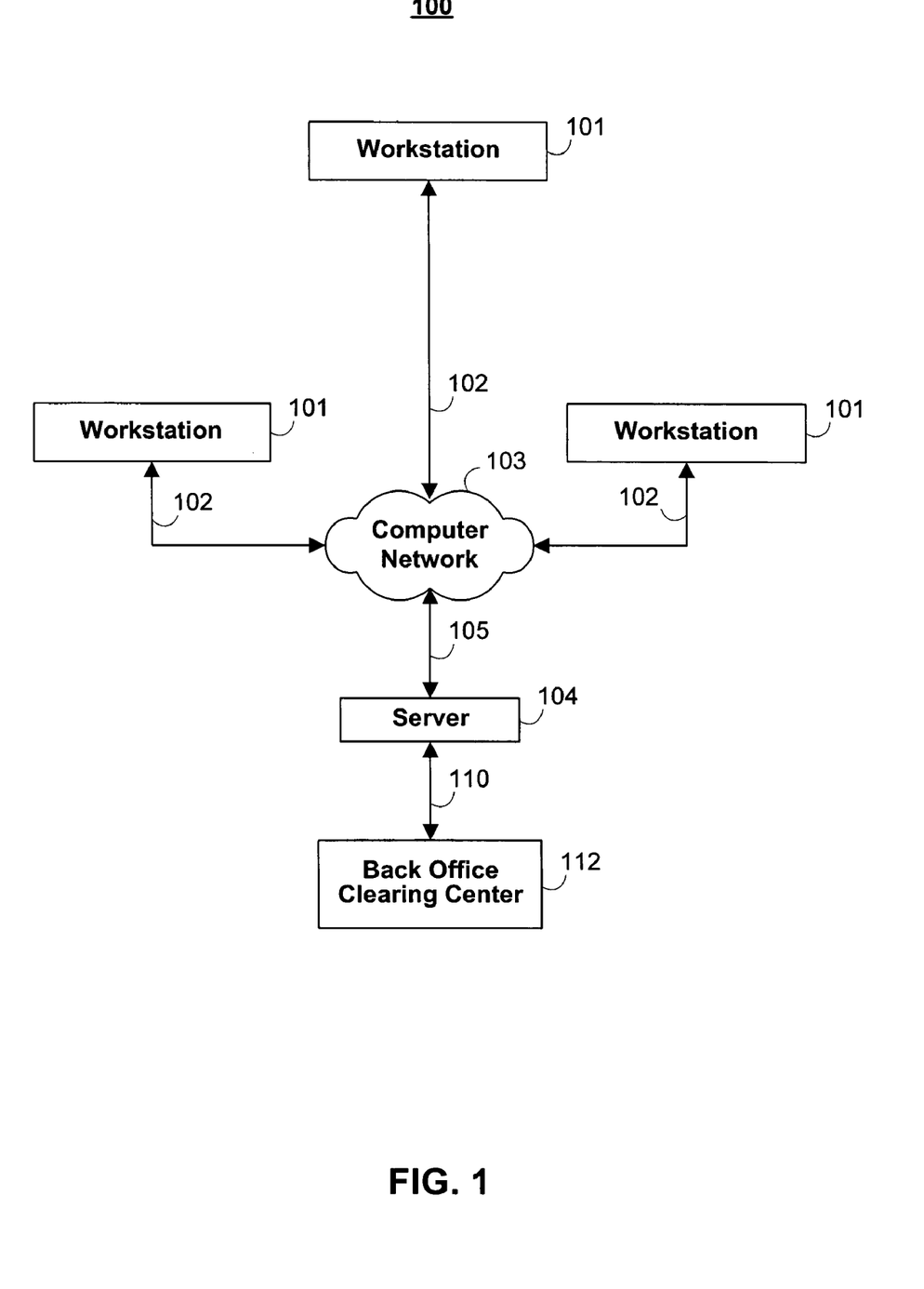
FIG. 1 is an illustration of an electronic implementation of a system in accordance with some embodiments of the present invention.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 and back office clearing center 112 may form part of the electronic trading system. Furthermore, server 104 may also contain an electronic trading system and application programming interface and merely transmit a Graphical User Interface or other display screens to the user at the user workstation, or the Graphical User Interface may reside on Workstation 101.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, programmed computers having memory, the programmed computer using the memory for implementing trading models, etc., or any combination of the same. Workstations 102 may be used to implement the electronic trading system application and application programming interface according to the invention.

Back office clearing center 112 may be any suitable equipment, such as a computer, a laptop computer, a mainframe computer, etc., or any combination of the same, for causing transactions to be cleared through a clearinghouse and/or verifying that transactions are cleared through a clearinghouse. (This clearing is not to be confused with being clear to trade, which is defined in more detail above.) Communications link 110 may be any communications links suitable for communicating data between server 104 and back office clearing center 112, such as network links, dial-up links, wireless links, hard-wired links, etc.

Figure 2:
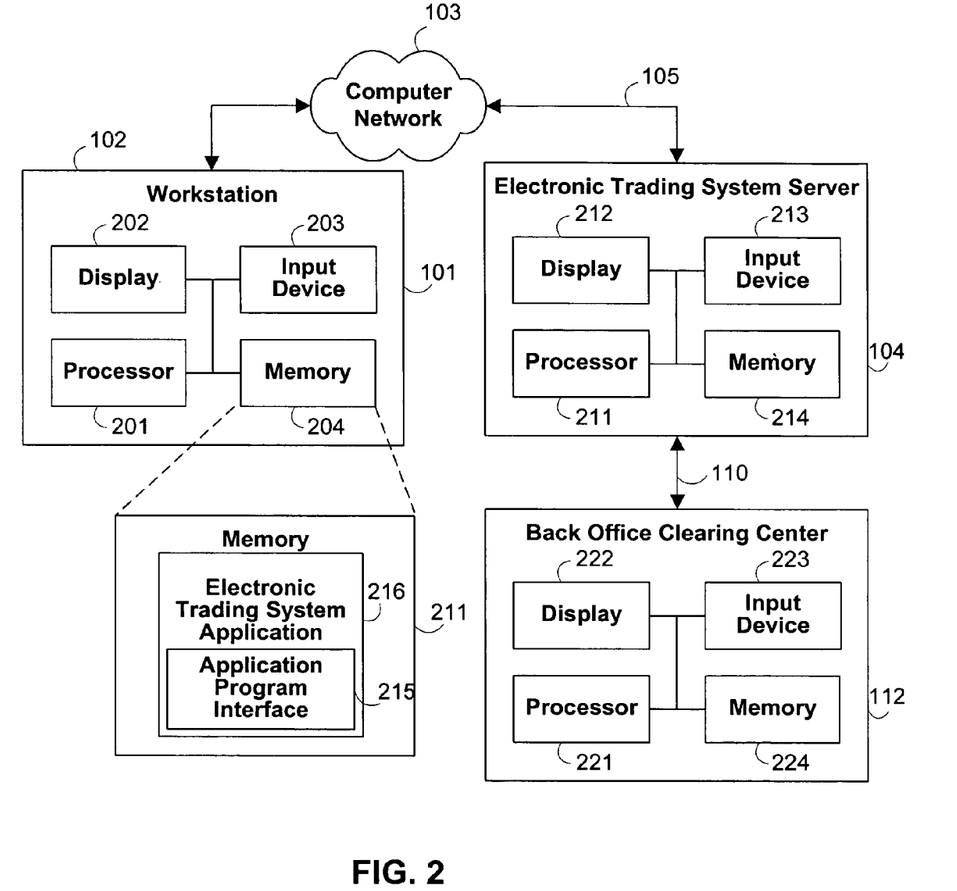
FIG. 2 is an illustration, in greater detail, of an electronic implementation of a system in accordance with some embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. The storage device may include software stored on a suitable storage medium such as a disk. Memory 204 also preferably contains an electronic trading system application 216 according to the invention.

Electronic trading system application 216 may preferably include application program interface 215, or alternatively, as described above, electronic trading system application 216 may be resident in the memory of server 104. In this embodiment, the electronic trading system may contain application program interface 215 as a discrete application from the electronic trading system application which also may be included therein. The only distribution to the user may then be a Graphical User Interface which allows the user to interact with electronic trading system application 216 resident at server 104.

Processor 201 uses the workstation program to present on display 202 electronic trading system application information relating to market conditions received through communication link 102 and trading commands and values transmitted by a user of workstation 101. Furthermore, input device 203 may be used to manually enter commands and values in order for these commands and values to be communicated to the electronic trading system.

Figure 3:
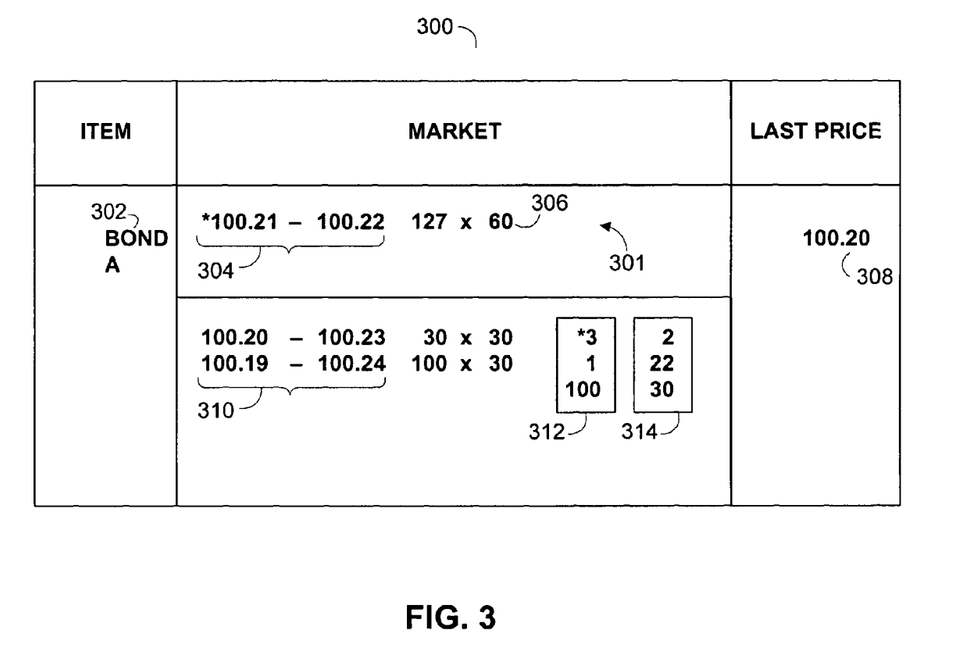
FIG. 3 is an illustration of an electronic trading interface in accordance with some embodiments of the present invention.

FIG. 3 shows an illustrative trading interface 300. Interface 300 is preferably for interactive trading and is adapted for implementing systems and methods according to the present invention. The interface includes a top line 301 (alternatively referred to herein as the touch line, or the headline.) Top line 301 may preferably be adapted to include the price that should be initially aggressed to start a trade or, alternatively, top line 301 may show the status of the actual aggressed trade. In either case, top line 301 is typically located at the top of the quad (quad being defined for purposes of this application as the display area related to trading of a particular instrument.) Top line 301 may include item 302, price 304, size 306 and last price 308. Interface 300 also includes market depth information 310, which shows price and size for items that have not yet been traded (commonly referred to as the order book, or, simply, the book). Also shown in interface 300 are bid and offer stacks 312 and 314, respectively. Bid and offer stacks 312 and 314 may indicate the size of one or many market participants that are bidding or offering at the current price 304. Note that price 304 in this exemplary example is shown in a traditional United States Government Bond pricing format.

Typically, an incoming order that is not clear to trade is indicated by a visual indicator—e.g., an asterisk preferably adjacent to the price associated with the new order (See, asterisk adjacent to price 304 in FIG. 3). In the embodiment shown in FIG. 3, in the particular circumstance where only a portion of an order is not cleared to trade, a visual indicator may be displayed in bid and offer stacks 312 and 314 adjacent the volume of the partially cleared order to indicate that only a portion of the order is cleared to be traded, or in some other suitable location which differentiates the partially cleared order from the totally uncleared order or from the totally clear order.

Figure 4:
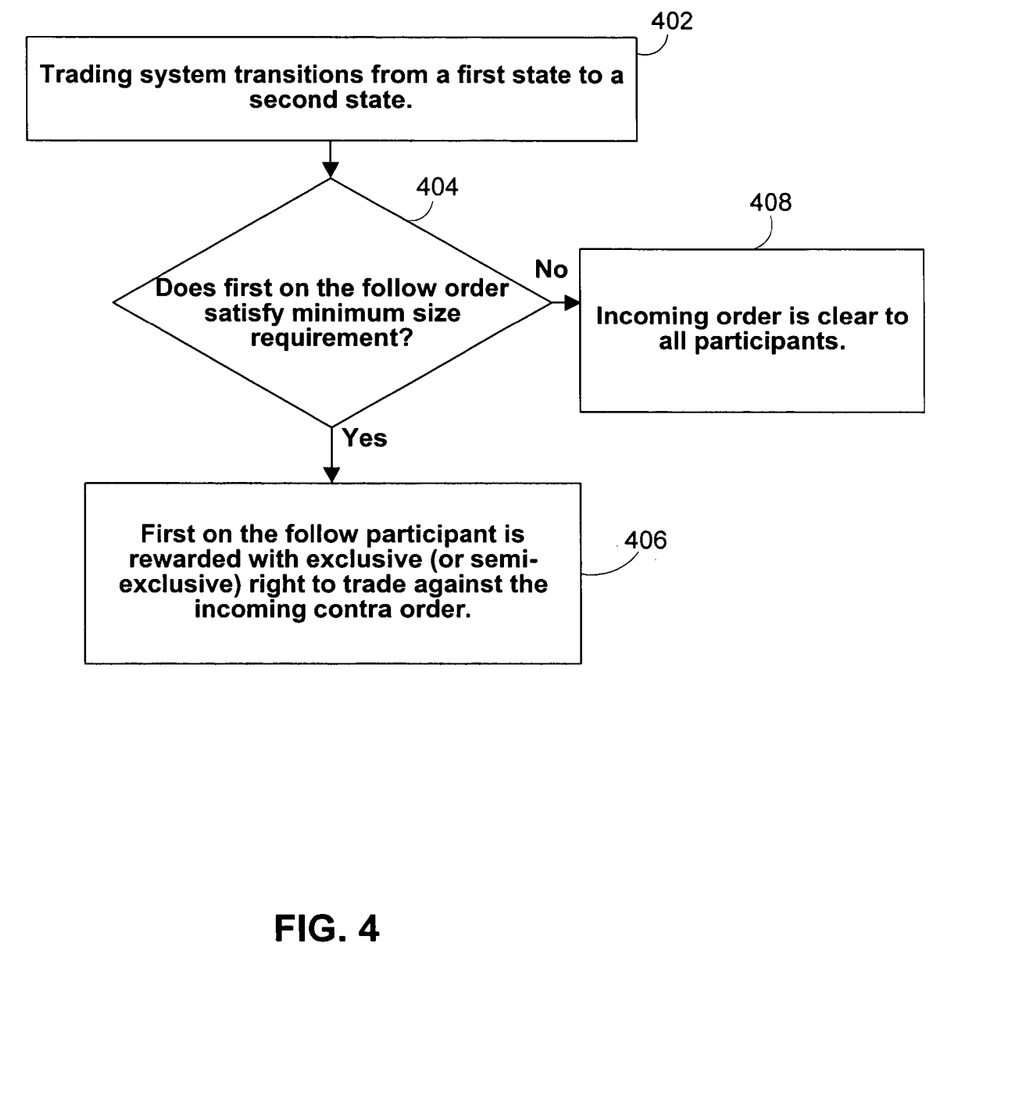
FIGS. 4-11 are flowcharts of various methods according to the invention.

FIG. 4 is a flow chart that describes one embodiment of a method according to the invention. Step 402 shows that the trading system transitions from a first state to a second state. The interface in FIG. 3 may show a trading state such as a bid/offer state in which participants enter their respective bids and offers. Other states may include a trading state wherein certain of the participants may engage in trading and subsequent negotiations associated therewith. These and other exemplary states are described in detail in U.S. Pat. No. 6,560,580 which is hereby incorporated by reference in its entirety. Following the conclusion of activity or other termination of the trading state that allows trading and negotiation between participants, the system may transition to a bid/offer state or to some other suitable trading state. As such, the trader with first on the follow priority may enjoy exclusive trading rights to trade on incoming contra orders when the system transitions a trading state to bid/offer state.

Step 404 queries whether a first on the follow order in the system satisfies a minimum size requirement. Step 406 shows that, if the first on the follow order satisfies the minimum size requirement, then the participant associated with the first on the follow order is rewarded with exclusive rights to trade against the incoming contra order (assuming, in certain embodiments, that the incoming order has price/time priority over other current orders and that the incoming order also satisfies the minimum size requirement, see FIGS. 7-9, and the corresponding text).

It should be noted that each of FIGS. 4-9 share similar steps X02, X06, and X08. The FIGs. are differentiated, for the most part, based on the query step of X04 in which each flow chart describes a unique query.

Figure 5:
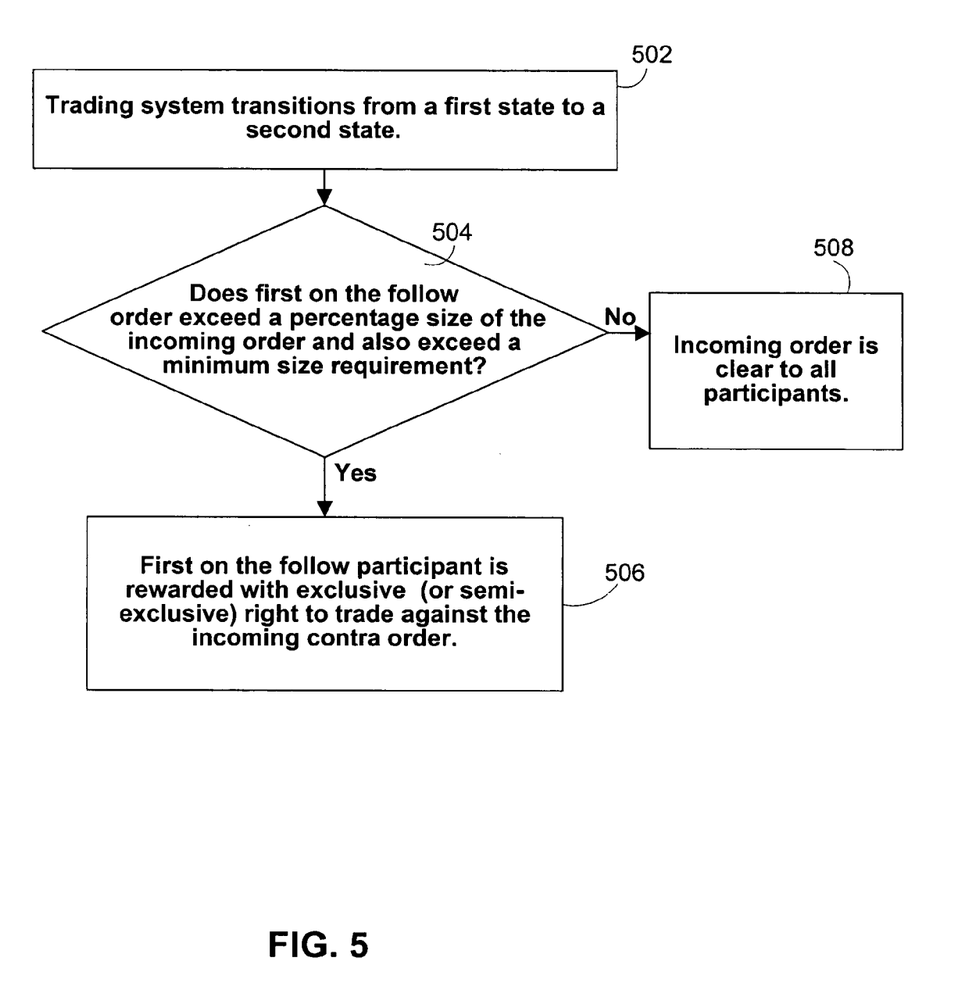

FIG. 5 is a flow chart describing another embodiment of a method according to the invention. Query step 504 queries whether a first on the follow order exceeds a percentage size of the incoming order and also exceeds a minimum size requirement. If the first on the follow order does satisfy the query, then the first on the follow participant associated with the first on the follow order may, under certain circumstances, be awarded an exclusive or semi-exclusive right to trade with the incoming order.

Figure 6:
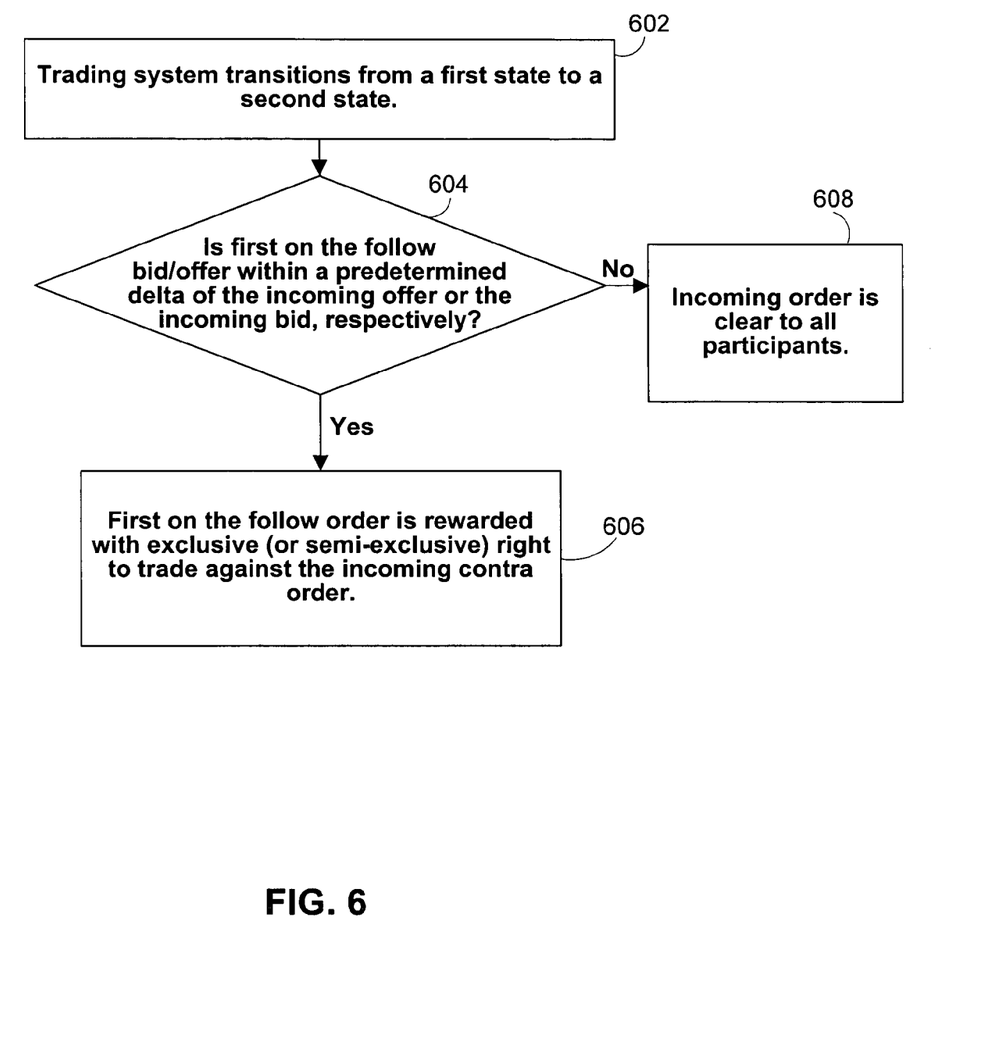

FIG. 6 is a flow chart describing yet another embodiment of a method according to the invention. Query step 604 queries whether any first on the follow order is within a predetermined delta, as described in more detail above, of the incoming bid or the incoming offer. If the first on the follow order is within the predetermined delta, then the first on the follow participant associated with the first on the follow order may, under certain circumstances, be awarded an exclusive or semi-exclusive right to trade with the incoming order.

Figure 7:
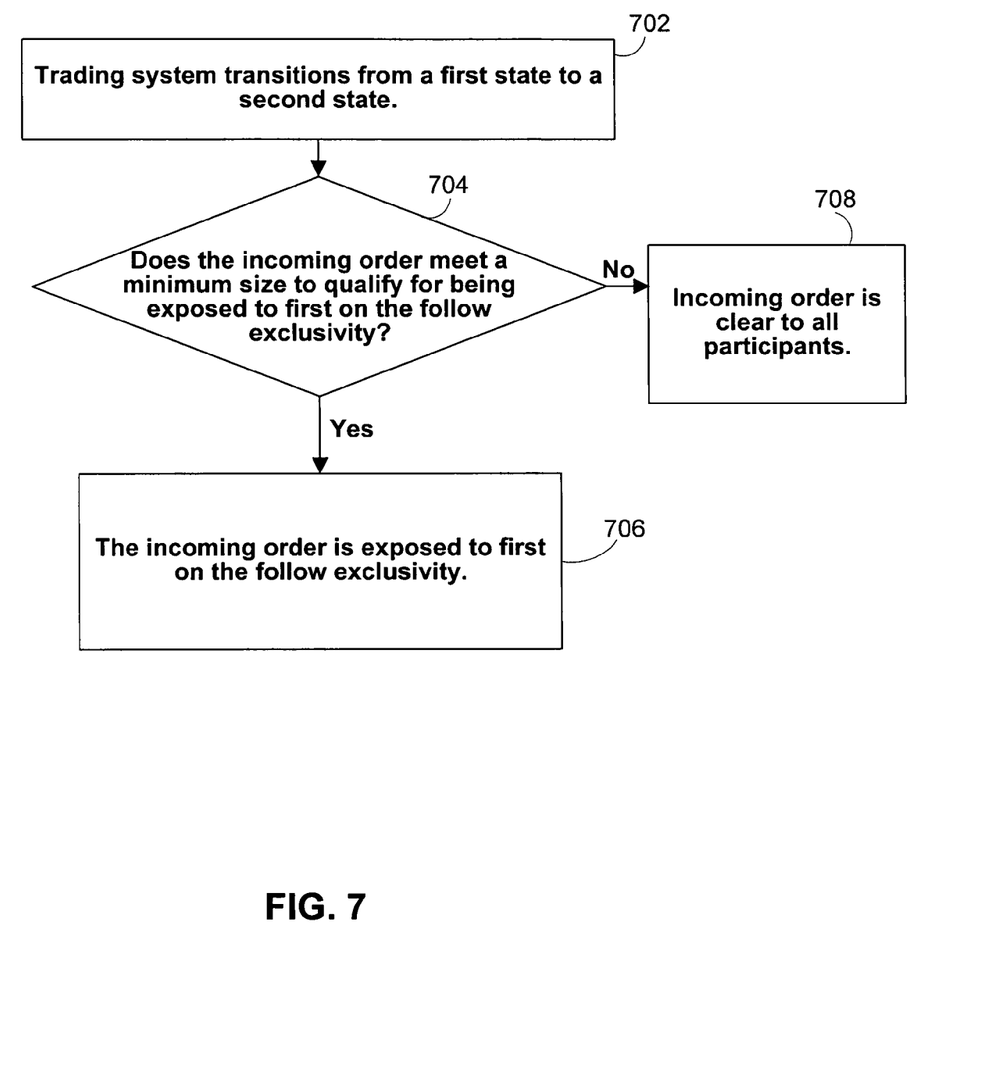

FIG. 7 is a flow chart describing still another embodiment of a method according to the invention. Step 704 queries whether an incoming order meets a minimum size to qualify for being clear only to a first on the follow participant or group of participants. If the incoming order meets the minimum size, then the incoming order may be clear to the first on the follow participant or group of participants.

Figure 8:
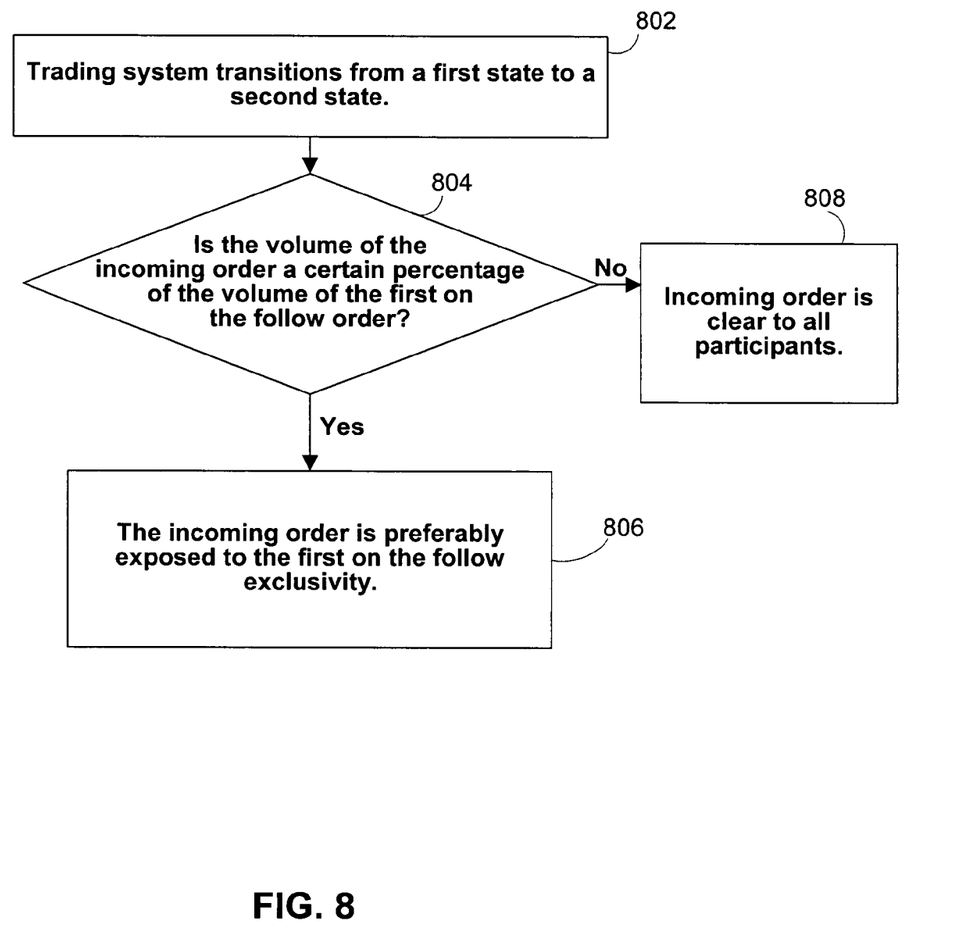

FIG. 8 is a flow chart describing yet another embodiment of a method according to the invention. Step 804 queries whether an incoming order includes a volume that is a certain, preferably predetermined, percentage (or other suitable metric) of the volume of the first on the follow contra order, then the incoming order may be clear to the first on the follow participant or group of participants. If the incoming order is a certain percentage of the first on the follow contra order, then the incoming order may be clear to the first on the follow participant or group of participants.

Figure 9:
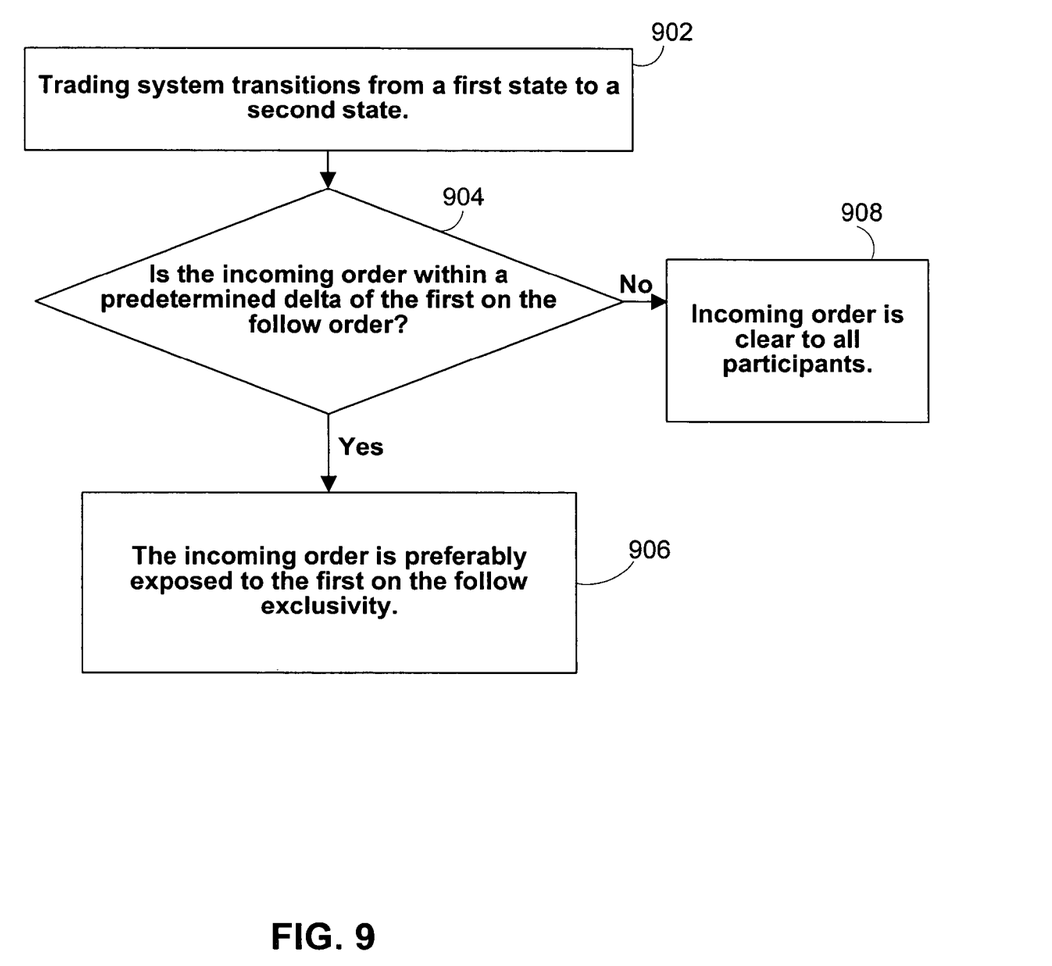

FIG. 9 is a flow chart describing another embodiment of a method according to the invention. Step 904 queries whether an incoming order is within a predetermined delta of the first on the follow order. If the incoming order is within a predetermined delta of the first on the follow contra order, then the incoming order may be clear to the first on the follow participant or group of participants.

It should be noted that each of the different query steps in FIGS. 4-9 may be used simultaneously with one another to provide multiple queries that are combined to determine whether any first on the follow order or, alternatively, any incoming order, is rewarded with exclusivity. Thus, the trading system may query numerous different queries before a current participant associated with a current order is awarded exclusive or semi-exclusive rights to trade with an incoming order.

Figure 10:
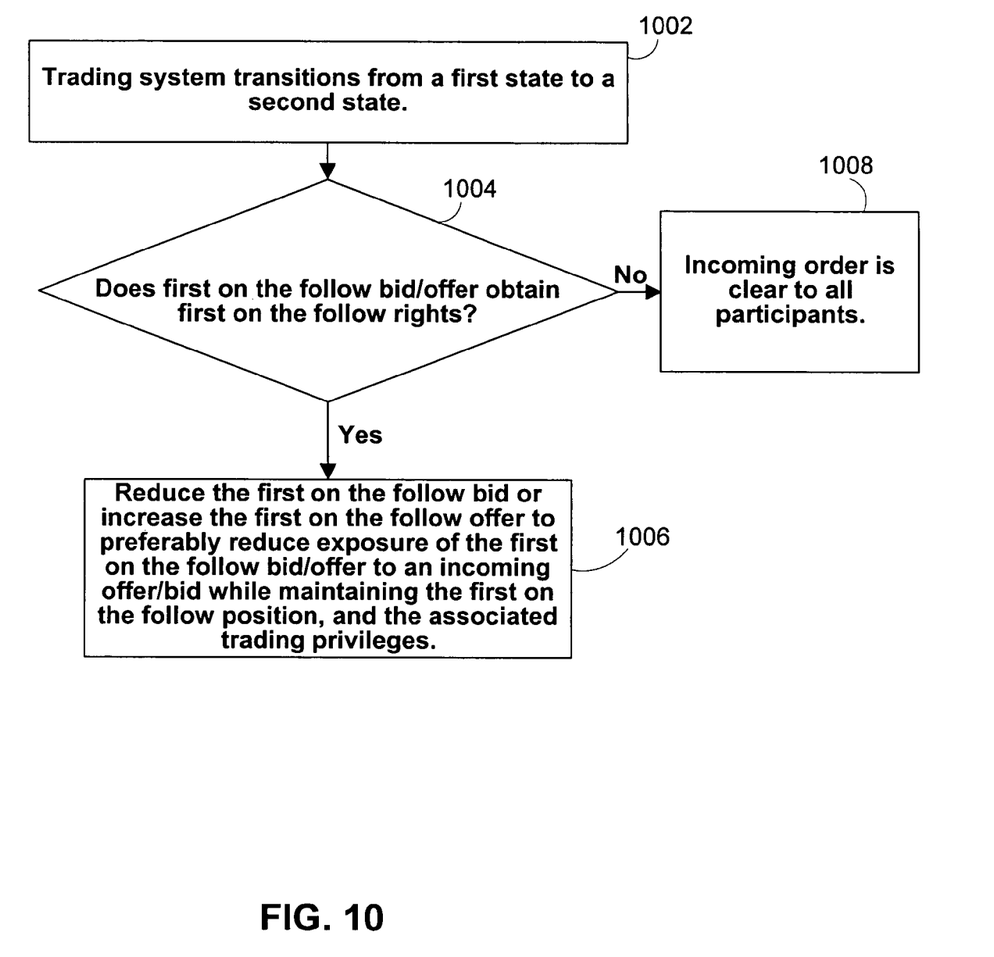

FIG. 10 shows a flow chart that includes step 1004 that queries whether first on the follow rights have been obtained. If first on the follow rights have been obtained by a participant, then step 1006 teaches that either a pre-set system default, or a participant-set feature, may reduce the first on the follow bid or increase the first on the follow offer to preferably reduce exposure to any incoming offer/bid, while maintaining the first on the follow position, and the associated trading privileges. Exposure may also be reduced by decreasing the size of the first on the follow bid or offer. This reduction may be implemented independently or together with a price adjustment as described above.

Figure 11:
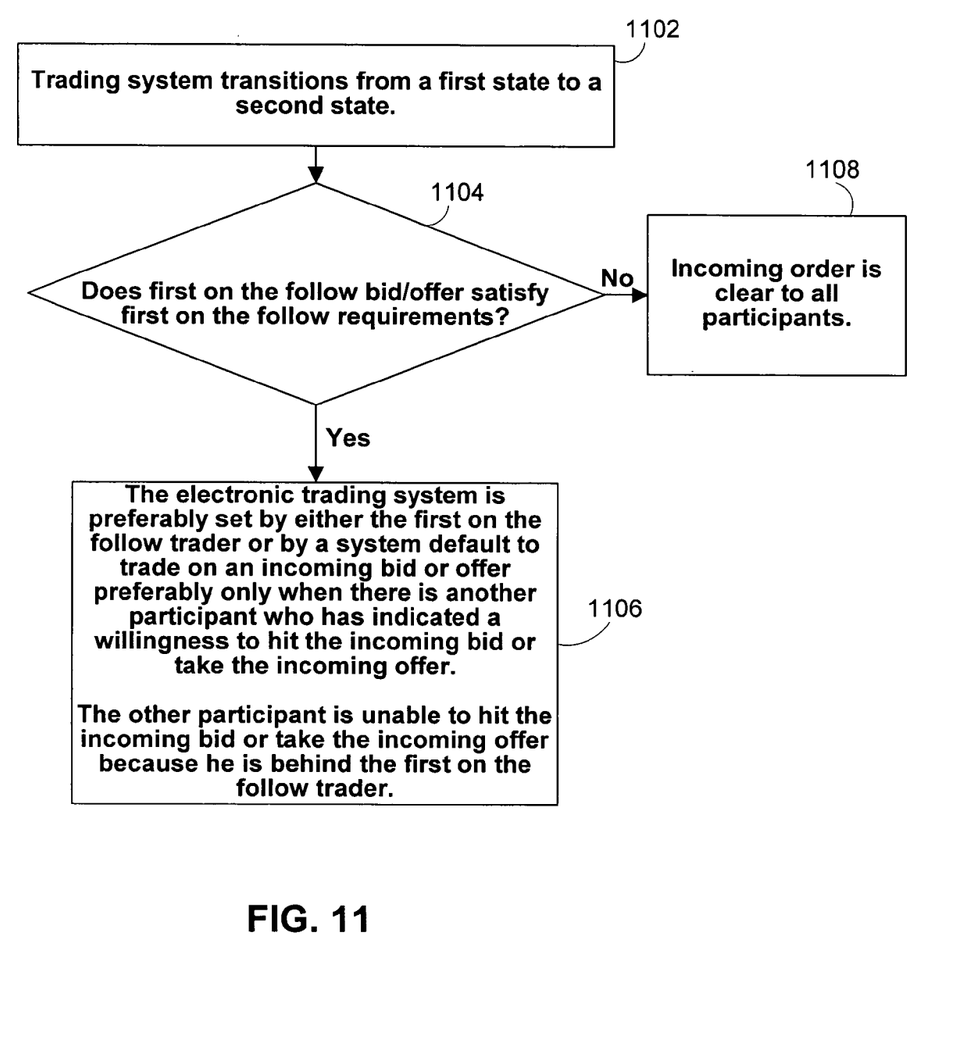

FIG. 11 shows a flow chart of yet another feature of the present invention. In this feature, step 1104 queries whether first on the follow rights have been obtained by satisfying certain criteria. If first on the follow rights have been obtained, then step 1106 teaches that the electronic trading system is preferably set by either the first on the follow trader or by a system default to trade on an incoming bid or offer preferably only when there is another participant who has indicated a willingness to hit the incoming bid or take the incoming offer. The other participant is preferably unable to hit the incoming bid or take the incoming offer because he is behind, with respect to trading priority, the first on the follow trader.

It should be noted that this particular feature is not limited to first on the follow but, in fact, extends to any suitable trading situation. Thus, any bid or offer could be placed whereby the bid is only active if another bid, having inferior trading rights because, for example, the inferior bid was later in time, is at the same price and has indicated a willingness to trade.

Thus, systems and method for defining criteria for obtaining exclusive priority in electronic trading systems have been provided. It will be understood that the foregoing is only illustrative of the principles of the invention, and that various modifications can be made by those skilled in the art without departing from the scope and spirit of the invention.

What is claimed is:

1. A method, comprising:
    transitioning by at least one computing device a trading system from a first trading state to a second trading state;
    determining by the at least one computing device, from among orders pending at a conclusion of the first trading state, a best order,
        wherein the best order comprises an order having a best price from among the pending orders, and
        wherein the best order is associated with a participant;
    determining by the at least one computing device that a size of the best order satisfies a minimum size requirement;
    based at least in part on (i) the participant having the best order and (ii) determining that the size of the best order satisfies the minimum size requirement, awarding by the at least one computing device to the participant a potential trading priority in the second trading state with respect to at least one contra order received in the second trading state;
    receiving by the at least one computing device a contra order in the second trading state, wherein the contra order is received from a workstation coupled to the at least one computing device via a communications network;
    based at least in part on awarding the participant with the potential trading priority, determining by the at least one computing device that the participant has a right to trade exclusively against the received contra order;
    determining by the at least one processor that a different participant indicates a willingness to trade against the received contra order; and
    based at least in part on (i) determining that the participant has the right to trade exclusively against the received contra order and (ii) determining that the different participant indicates the willingness to trade against the received contra order, automatically executing by the at least one computing device, on behalf of the participant, a trade against the received contra order.

2. The method of claim 1, further comprising:
    determining by the at least one computing device that the size of the best order exceeds a predetermined percentage of a size of the received contra order; and
    wherein determining that the participant has the right to trade exclusively against the received contra order comprises:
        determining that the participant has the right to trade exclusively against the received contra order based at least in part on determining that the size of the best order exceeds the predetermined percentage of the size of the received contra order.

3. The method of claim 1, further comprising:
    determining by the at least one computing device that a price of the best order is within a predetermined delta of a price of the received contra order; and
    wherein determining that the participant has the right to trade exclusively against the received contra order comprises:
        determining that the participant has the right to trade exclusively against the received contra order based at least in part on determining that the price of the best order is within the predetermined delta of the price of the received contra order.

4. The method of claim 1, further comprising:
    determining by the at least one computing device that a size of the received contra order satisfies a further minimum size requirement; and
    wherein determining that the participant has the right to trade exclusively against the received contra order comprises:
        determining that the participant has the right to trade exclusively against the received contra order based at least in part on determining that the size of the received contra order satisfies the further minimum size requirement.

5. The method of claim 1, further comprising:
    determining by the at least one computing device that a size of the received contra order exceeds a predetermined percentage of the size of the best order; and
    wherein determining that the participant has the right to trade exclusively against the received contra order comprises:
        determining that the participant has the right to trade exclusively against the received contra order based at least in part on determining that the size of the received contra order exceeds the predetermined percentage of the size of the best order.

6. The method of claim 1, further comprising:
    determining by the at least one computing device a price of the received contra order is within a predetermined delta of a price of the best order; and
    wherein determining that the participant has the right to trade exclusively against the received contra order comprises:
        determining that the participant has the right to trade exclusively against the received contra order based at least in part on determining that the price of the received contra order is within the predetermined delta of the price of the best order.

7. The method of claim 1,
    wherein the orders pending at the conclusion of the first trading state comprise bids pending at the conclusion of the first trading state;
    wherein the best order comprises a bid having a best price from among the pending bids; and
    wherein the received contra order comprises an offer.

8. The method of claim 1,
    wherein the orders pending at the conclusion of the first trading state comprise offers pending at the conclusion of the first trading state;
    wherein the best order comprises an offer having a best price from among the pending offers; and
    wherein the received contra order comprises a bid.

9. The method of claim 1, further comprising:
    based at least in part on awarding the participant with the potential trading priority, automatically modifying by the at least one computing device the best order, wherein modifying the best order does not affect the potential trading priority of the participant.

10. The method of claim 9, wherein modifying the best order comprises at least one of:
   modifying a size of the best order, and
   modifying a price of the best order.

11. The method of claim 9,
   wherein the best order comprises a bid; and
   wherein modifying the best order comprises at least one of:
      reducing a size of the bid, and
      reducing a price of the bid.

12. The method of claim 9,
   wherein the best order comprises a offer; and
   wherein modifying the best order comprises at least one of:
      reducing a size of the offer, and
      increasing a price of the offer.

13. The method of claim 9, wherein the at least one computing device automatically modifies the best order based at least in part on instructions preset by the participant.

14. The method of claim 9, wherein the at least one computing device automatically modifies the best order based at least in part on a preset default of the at least one computing device.

15. The method of claim 1,
   wherein the best order comprises (i) a hidden size not shown to other participants and (ii) a displayed size shown to other participants; and
   wherein the hidden size and the displayed size are considered in determining that the size of the best order satisfies the minimum size requirement.

16. The method of claim 1,
   wherein the best order comprises (i) a hidden size not shown to other participants and (ii) a displayed size shown to other participants; and
   wherein only the displayed is considered in determining that the size of the best order satisfies the minimum size requirement.

17. The method of claim 1, wherein the at least one computing device automatically executes the trade against the received contra order based at least in part on instructions preset by the participant.

18. The method of claim 1, wherein the at least one computing device automatically executes the trade against the received contra order based at least in part on a preset default of the at least one computing device.

19. An apparatus, comprising:
   at least one processor; and
   at least one memory device electronically coupled to the at least one processor, wherein the at least one memory device stores software which, when executed by the at least one processor, directs the at least one processor to:
   transition a trading system from a first trading state to a second trading state;
   determine, from among orders pending at a conclusion of the first trading state, a best order,
      wherein the best order comprises an order having a best price from among the pending orders, and
      wherein the best order is associated with a participant;
   determine that a size of the best order satisfies a minimum size requirement;
   based at least in part on (i) the participant having the best order and (ii) determining that the size of the best order satisfies the minimum size requirement, award to the participant a potential trading priority in the second trading state with respect to at least one contra order received in the second trading state;
   receive a contra order in the second trading state, wherein the apparatus is operable to receive the contra order from a workstation via a communications network;
   based at least in part on awarding the participant with the potential trading priority, determine that the participant has a right to trade exclusively against the received contra order;
   determine that a different participant indicates a willingness to trade against the received contra order; and
   based at least in part on (i) determining that the participant has the right to trade exclusively against the received contra order and (ii) determining that the different participant indicates the willingness to trade against the received contra order, automatically execute, on behalf of the participant, a trade against the received contra order.

20. The apparatus of claim 19, wherein the software, when executed by the at least one processor, further directs the at least one processor to:
   determine that the size of the best order exceeds a predetermined percentage of a size of the received contra order; and
   wherein determining that the participant has the right to trade exclusively against the received contra order comprises:
      determining that the participant has the right to trade exclusively against the received contra order based at least in part on determining that the size of the best order exceeds the predetermined percentage of the size of the received contra order.

21. The apparatus of claim 19, wherein the software, when executed by the at least one processor, further directs the at least one processor to:
   determine that a price of the best order is within a predetermined delta of a price of the received contra order; and
   wherein determining that the participant has the right to trade exclusively against the received contra order comprises:
      determining that the participant has the right to trade exclusively against the received contra order based at least in part on determining that the price of the best order is within the predetermined delta of the price of the received contra order.

22. The apparatus of claim 19, wherein the software, when executed by the at least one processor, further directs the at least one processor to:
   determine that a size of the received contra order satisfies a further minimum size requirement; and
   wherein determining that the participant has the right to trade exclusively against the received contra order comprises:
      determining that the participant has the right to trade exclusively against the received contra order based at least in part on determining that the size of the received contra order satisfies the further minimum size requirement.

23. The apparatus of claim 19, wherein the software, when executed by the at least one processor, further directs the at least one processor to:
   determine that a size of the received contra order exceeds a predetermined percentage of the size of the best order; and
   wherein determining that the participant has the right to trade exclusively against the received contra order comprises:
      determining that the participant has the right to trade exclusively against the received contra order based at least in part on determining that the size of the received contra order exceeds the predetermined percentage of the size of the best order.

24. The apparatus of claim 19, wherein the software, when executed by the at least one processor, further directs the at least one processor to:
   determine that a price of the received contra order is within a predetermined delta of a price of the best order; and
   wherein determining that the participant has the right to trade exclusively against the received contra order comprises:
      determining that the participant has the right to trade exclusively against the received contra order based at least in part on determining that the price of the received contra order is within the predetermined delta of the price of the best order.

25. The apparatus of claim 19,
   wherein the orders pending at the conclusion of the first trading state comprise bids pending at the conclusion of the first trading state;
   wherein the best order comprises a bid having a best price from among the pending bids; and
   wherein the received contra order comprises an offer.

26. The apparatus of claim 19,
   wherein the orders pending at the conclusion of the first trading state comprise offers pending at the conclusion of the first trading state;
   wherein the best order comprises an offer having a best price from among the pending offers; and
   wherein the received contra order comprises a bid.

27. The apparatus of claim 19, wherein the software, when executed by the at least one processor, further directs the at least one processor to:
   based at least in part on awarding the participant with the potential trading priority, automatically modify the best order, wherein modifying the best order does not affect the potential trading priority of the participant.

28. The apparatus of claim 27, wherein modifying the best order comprises at least one of:
   modifying a size of the best order, and
   modifying a price of the best order.

29. The apparatus of claim 27,
   wherein the best order comprises a bid; and
   wherein modifying the best order comprises at least one of:
      reducing a size of the bid, and
      reducing a price of the bid.

30. The apparatus of claim 27,
   wherein the best order comprises a offer; and
   wherein modifying the best order comprises at least one of:
      reducing a size of the offer, and
      increasing a price of the offer.

31. The apparatus of claim 27, wherein the at least one processor automatically modifies the best order based at least in part on instructions preset by the participant.

32. The apparatus of claim 27, wherein the at least one processor automatically modifies the best order based at least in part on a preset default of the apparatus.

33. The apparatus of claim 19,
   wherein the best order comprises (i) a hidden size not shown to other participants and (ii) a displayed size shown to other participants; and
   wherein the hidden size and the displayed size are considered in determining that the size of the best order satisfies the minimum size requirement.

34. The apparatus of claim 19,
   wherein the best order comprises (i) a hidden size not shown to other participants and (ii) a displayed size shown to other participants; and
   wherein only the displayed is considered in determining that the size of the best order satisfies the minimum size requirement.

35. The apparatus of claim 19, wherein the at least one processor automatically executes the trade against the received contra order based at least in part on instructions preset by the participant.

36. The apparatus of claim 19, wherein the at least one processor automatically executes the trade against the received contra order based at least in part on a preset default of the apparatus.

* * * * *